United States Patent
Roos et al.

(10) Patent No.: US 7,388,313 B2
(45) Date of Patent: Jun. 17, 2008

(54) ARMATURE FOR A DIRECT CURRENT MOTOR

(75) Inventors: Gerald Roos, Sasbachried (DE); Werner Grosch, Bad Krozingen-Hausen (DE); Harold Bitzer, Buehl (DE); Guenter Kastinger, Gaggenau-Sulzbach (DE); Wilhelm Braun, Buehl (DE); Gabriele Pfeiffer, Darmstadt (DE); Jochen Oser, Sinzheim (DE); Markus Rauschning, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 19 days.

(21) Appl. No.: 10/590,736

(22) PCT Filed: Jan. 20, 2005

(86) PCT No.: PCT/EP2005/050228

§ 371 (c)(1),
(2), (4) Date: Aug. 25, 2006

(87) PCT Pub. No.: WO2005/081380

PCT Pub. Date: Sep. 1, 2005

(65) Prior Publication Data

US 2007/0176510 A1 Aug. 2, 2007

(30) Foreign Application Priority Data

Feb. 25, 2004 (DE) ............. 10 2004 008 936

(51) Int. Cl.
*H02K 1/06* (2006.01)

(52) U.S. Cl. .............. 310/217; 310/218; 310/264

(58) Field of Classification Search ........ 310/216–218, 310/264, 269, 258, 259, 182, 197
See application file for complete search history.

(56) References Cited

U.S. PATENT DOCUMENTS

| 5,578,878 | A | | 11/1996 | Hall |
| 5,604,389 | A | | 2/1997 | Nitta et al. |
| 5,798,583 | A | * | 8/1998 | Morita ................. 310/42 |
| 5,894,182 | A | * | 4/1999 | Saban et al. ............ 310/217 |
| 6,064,132 | A | * | 5/2000 | Nose .................... 310/216 |
| 6,236,934 | B1 | * | 5/2001 | Dyer et al. ............. 701/124 |
| 6,563,245 | B1 | | 5/2003 | Suzuki et al. |
| 2002/0163278 | A1 | * | 11/2002 | Gauthier et al. ......... 310/216 |
| 2004/0056556 | A1 | * | 3/2004 | Fujita .................... 310/217 |
| 2004/0119368 | A1 | * | 6/2004 | Frager et al. ........... 310/217 |
| 2004/0124737 | A1 | * | 7/2004 | Yamamoto et al. ...... 310/269 |
| 2004/0189137 | A1 | * | 9/2004 | Hashimoto et al. ...... 310/218 |
| 2007/0176510 | A1 | * | 8/2007 | Roos et al. ............. 310/216 |

FOREIGN PATENT DOCUMENTS

| DE | 94 16 669 U1 | 12/1994 |
| DE | 100 45 549 A1 | 3/2001 |
| JP | 4-185247 | 7/1992 |

* cited by examiner

*Primary Examiner*—Thanh Lam
(74) *Attorney, Agent, or Firm*—Ronald E. Greigg

(57) ABSTRACT

An armature for a direct current motor, in particular for a permanent-magnet-excited DC motor, has an armature body, with armature teeth joined in one piece together via a short-circuit ring and offset by equal circumferential angles, each with a tooth neck for receiving an armature winding and with a tooth head that protrudes past the tooth neck in the circumferential direction. For an axial lengthening of the armature body that is simple and economical to produce, one preferably stacked flux-conducting element each, whose profile corresponds to the tooth head profile, is placed on the axially pointing end faces of the tooth heads.

18 Claims, 3 Drawing Sheets

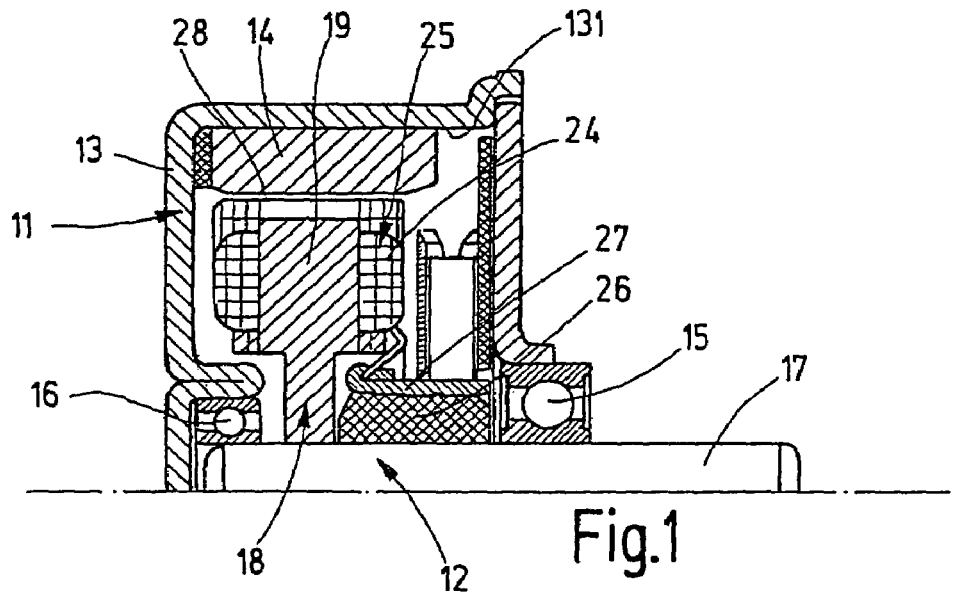
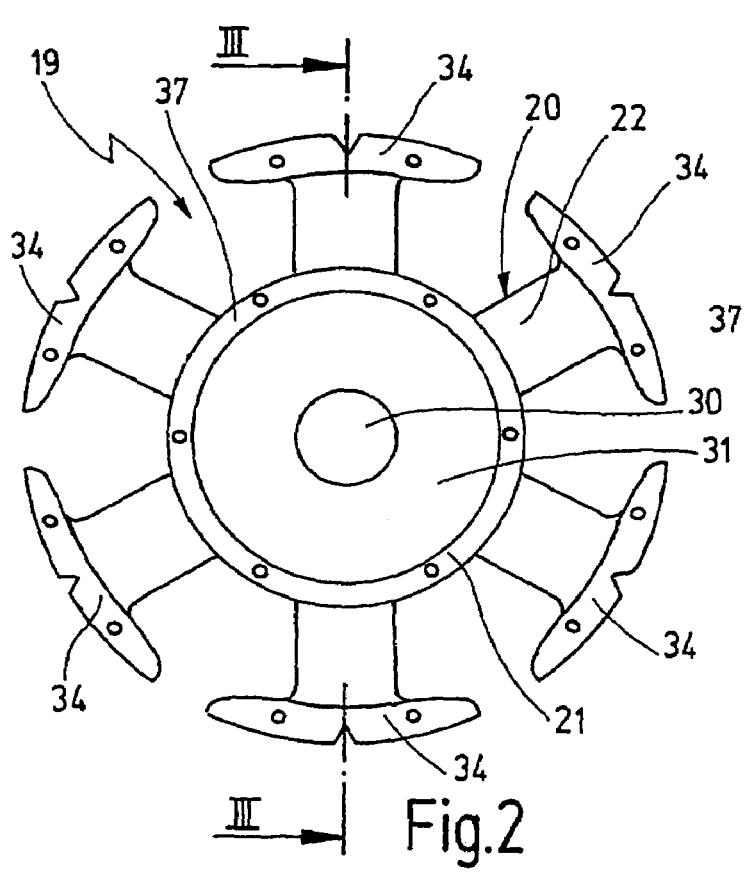
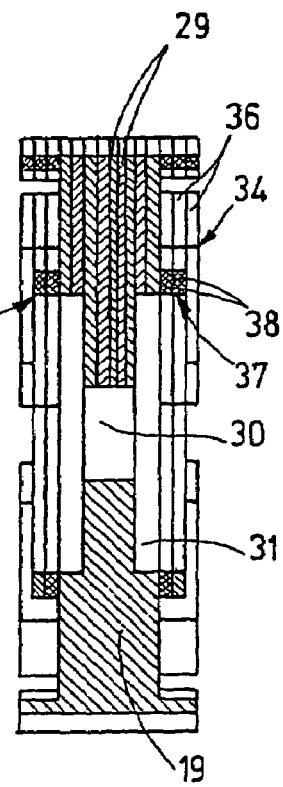
Fig.1
Fig.2
Fig.3

ARMATURE FOR A DIRECT CURRENT MOTOR

CROSS-REFERENCE TO RELATED APPLICATIONS

This application is a 35 USC 371 application of PCT/EP 2005/050228 filed on Jan. 20, 2005.

BACKGROUND OF THE INVENTION

1. Field of the Invention

The invention is directed to an improved armature for a direct current motor, in particular for a permanent-magnet-excited direct current motor.

2. Description of the Prior Art

In permanent-magnet-excited direct current or DC motors, to increase the magnetic flux in the armature body, the axial length of the permanent magnets is selected to be greater than the axial length of the armature body (German Patent Disclosure DE 199 42 903 A1, FIGS. 5 and 12). This effect is further reinforced if the armature body as additionally lengthened in the axial direction as well. By increasing the magnetic flux, the specific weight of the DC motor can be increased, or for the same motor power, a shorter axial length of the motor can be attained.

In a known DC motor (German Patent Disclosure DE 100 45 549 A1), the armature body comprises a supporting part made of resin, which is embodied in one piece with the armature shaft and has a shorter axial length than the permanent magnets, and a core, seated on the supporting part in a manner fixed against relative rotation, the core being made as a mold-cast part from a soft magnetic powder. The core has an integral outer wall of soft magnetic powder, which leaving an air gap is located opposite the permanent magnets and has approximately the same axial length as the permanent magnets. The concave portion defined by the outer wall, a stepped portion of the core, and a concave portion of the core defined by the support part bring about the position of the armature winding.

SUMMARY AND ADVANTAGES OF THE INVENTION

The armature of the invention for a direct current motor has the advantage that the armature body, in the region of the tooth head, in lengthened by the flux-conducting elements in a way that is simpler and more economical to produce, and as a result, the desired increase in the magnetic flux is attained. Despite axially lengthened tooth heads, the armature body has a shape that is advantageously simple from a production standpoint. With armature bodies typically conceived of as a sheet-metal lamination packet, an arbitrary armature length can be realized by stacking up an arbitrary number of identically designed sheet-metal laminations in one tool and making a packet of them by stamping, and the flux reinforcement is then brought about by axially placing the flux-conducting elements on top of the stack.

Advantageous Refinements of and Improvements to the Armature are Disclosed

In an advantageous embodiment of the invention, the flux-conducting elements are linked in pushbutton-like fashion to the tooth heads. To that end, in a preferred embodiment of the invention, linking holes, preferably two linking holes spaced apart from one another, are provided in the face ends of the tooth heads, and axially protruding linking pins, preferably two linking pins spaced apart from one another, which can be pressed into the linking holes are provided on each flux-conducting element.

In an advantageous embodiment of the invention, at least one barrier in the form of a ring is placed on each of the axially pointing end faces of the short-circuit ring. This barrier prevents the winding head of the armature winding from protruding into regions of the armature body that must be kept free for the installation of a bearing or a commutator.

In an advantageous embodiment of the invention, the annular barriers are buttoned in pushbutton-like fashion onto the short-circuit ring, in the same way as the flux-conducting elements are buttoned onto the tooth heads of the armature teeth. To that end, once again a plurality of linking holes are provided on the end faces of the short-circuit ring, and corresponding linking pins are provided in the annular barriers for being pressed into the linking holes. Preferably, the number of linking holes in each face end of the short-circuit ring and correspondingly the number of linking pins on the end face of each barrier are selected to be equal to the number of armature teeth of the armature body.

In an advantageous embodiment of the invention, the armature body is composed of a plurality of identically designed armature laminations resting on one another; the flux-conducting elements and/or the barriers may also be stacked. Preferably, the thickness or axial width of the laminations of the flux-conducting elements and/or barriers is selected to be equal to the lamination thickness of the armature laminations.

BRIEF DESCRIPTION OF THE DRAWINGS

The invention is described in further detail herein below in terms of an exemplary embodiment with reference to the drawings, in which:

FIG. 1 is a half longitudinal section through a direct current motor according to the invention;

FIG. 2, an end view of an armature body of the DC motor of FIG. 1;

FIG. 3, a section taken along the line III-III in FIG. 2;

DESCRIPTION OF THE PREFERRED EMBODIMENT

Figures 4, 5:
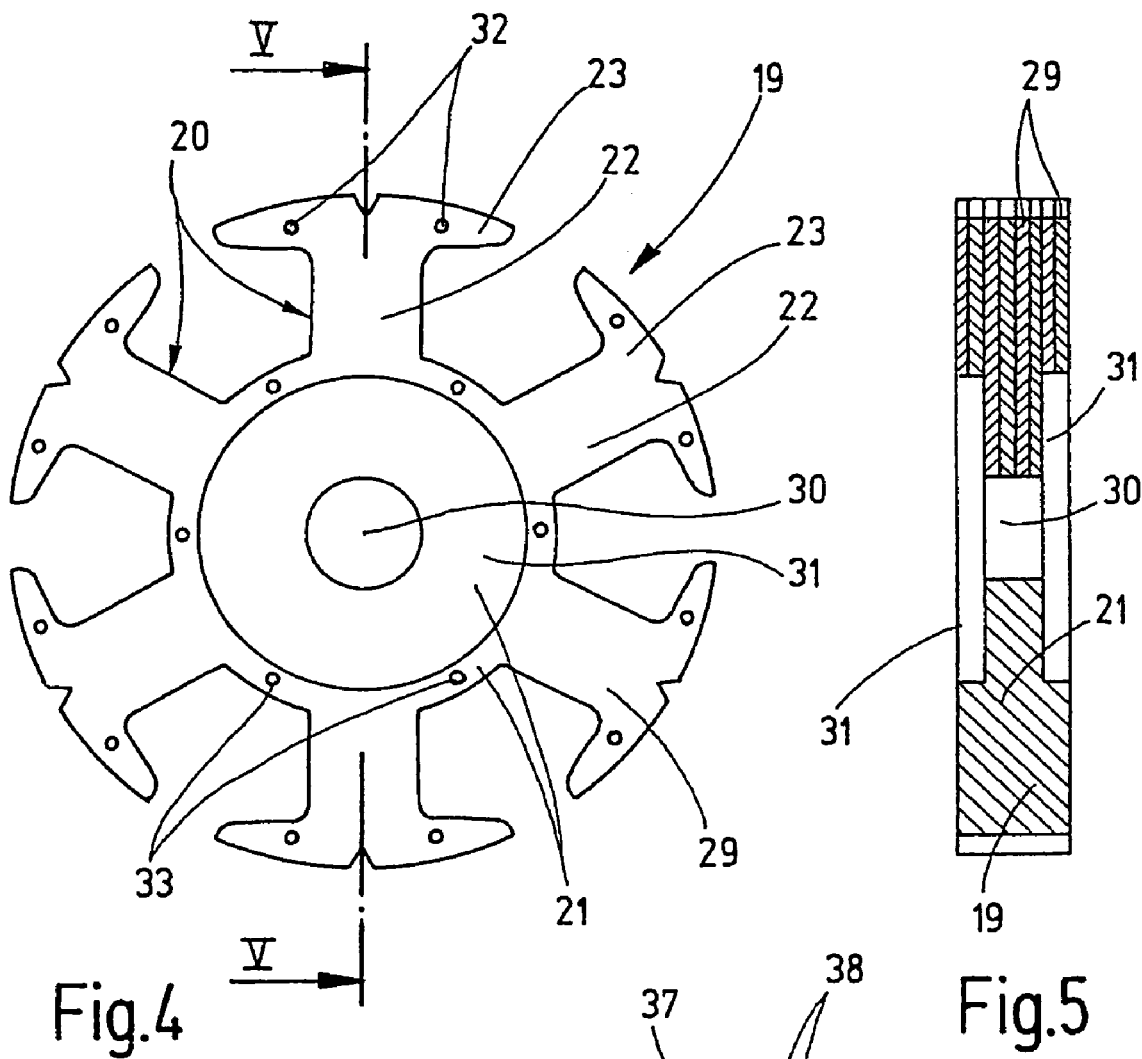
FIG. 4, the same view as in FIG. 2, with the flux-conducting elements and barriers removed.
FIG. 5, a section taken along the line V-V in FIG. 4.

The direct current motor, also known as a DC motor, shown in half longitudinal section in FIG. 1 has a stator 11 and a rotor 12, embodied as an internal rotor. The stator 11 has a housing 13 for the magnetic short circuit, on whose annular inner wall 131 permanent magnets 14 of successively opposed polarity are offset from one another by equal circumferential angles. The rotor 12 has a rotor or armature shaft 17, supported in the stator 11 via two rotary bearings 15, 16, and one armature 18, held on the armature shaft 17 in a manner fixed against relative rotation. The armature 18 has an armature body 19, with a plurality of armature teeth 20, in this exemplary embodiment six of them, which are joined together via a short-circuit ring 21 (FIGS. 4 and 5), and an armature winding 25. The armature teeth 20 and the short-circuit ring 21 are embodied in one piece. Each armature tooth 20 has one radially extending tooth neck 22 and one tooth head 23, protruding symmetrically from both sides past the tooth neck 22 in the circumferential direction. One annular coil 24 of the armature winding 25 is wound onto each tooth neck 22. The annular coils 24 are braced in the radial direction on one end on the tooth head 23 and on the other on the short-circuit ring 21. A commutator 26 is disposed on the armature shaft 17 in a manner fixed against relative rotation, and the coil ends of the annular coils 24 are joined by its commutator laminations 27. The armature 18 is located concentrically with the stator 11; an air gap 28 remains between the inner faces, facing toward one another, of the permanent magnets 14 and the outer faces of the tooth heads 23.

As can be seen from FIGS. 4 and 5, the armature body 19 is composed of many armature laminations 29, resting on one another and joined together by stamping packeting, all of them having the same stamping cut, as can be seen in plan view in FIG. 4. Thus each armature lamination 29 has one lamination of the short-circuit ring 21, the tooth necks 22, and the tooth heads 23. A central through hole 30 serves to mount the stacked armature body 19 onto the armature shaft 17. The two outer laminations on each side of the armature body 19 have a through hole 31 of substantially larger diameter, so that on the two face ends of the armature body 19, an indentation is formed into which, for the sake of achieving an axially compact structure, such components of the motor as the commutator 26 and rotary bearings 16 protrude.

The two outer laminations 29 of the armature body 19 are provided, on the one hand in the region of each tooth head 23, with two linking holes 32 per tooth head 23, spaced apart equally in the circumferential direction from one another, and on the other, in the region of the short-circuit ring 21, they are provided with linking holes 33, which are located equidistantly in the circumferential direction. In the exemplary embodiment of FIG. 4, the number of linking holes 33 corresponds to the number of armature teeth 20 present. The linking holes 33 are each located centrally between two successive armature teeth 20 in the short-circuit ring 21.

Figures 6, 7:
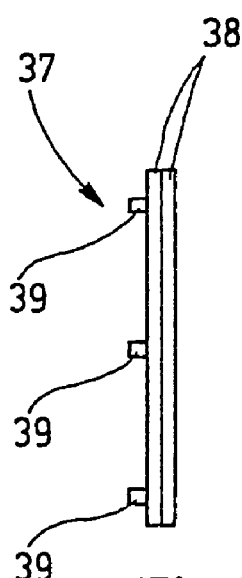
FIG. 6, a side view of a flux-conducting element in FIG. 2.
FIG. 7, a side view of a barrier in FIG. 2.

To achieve a maximum specific weight of the motor, on the one hand the permanent magnets 14 of the stator 11 are embodied as longer than the armature body 19 (FIG. 1), and on the other, the armature body 19 is additionally lengthened in the axial direction. This lengthening is achieved with flux-conducting elements 34 (FIGS. 2 and 7), which are mounted on both face ends of the armature body 19 onto each end face of the tooth heads 23. The flux-conducting elements 34 are adapted in their profile to the tooth head profile, so that they rest congruently with the tooth heads 23. For being secured to the tooth heads 23, the flux-conducting elements 34 have linking pins 35 (FIG. 6), which have the same spacing from one another as the linking holes 32 (FIG. 2) in the tooth head region of the two outer armature laminations 29. The linking pins 35 are embodied such that they can be pressed by nonpositive engagement into the linking holes 32. As FIGS. 3 and 6 show, the flux-conducting elements 34 are stacked and are put together by stamping packeting, for instance from three laminations 36 or so-called flux-conducting laminations. The thickness of the laminations 36 in the axial direction is equivalent to the axial thickness of the armature laminations 29. All the flux-conducting elements have the same number of laminations 36.

Figure 8:
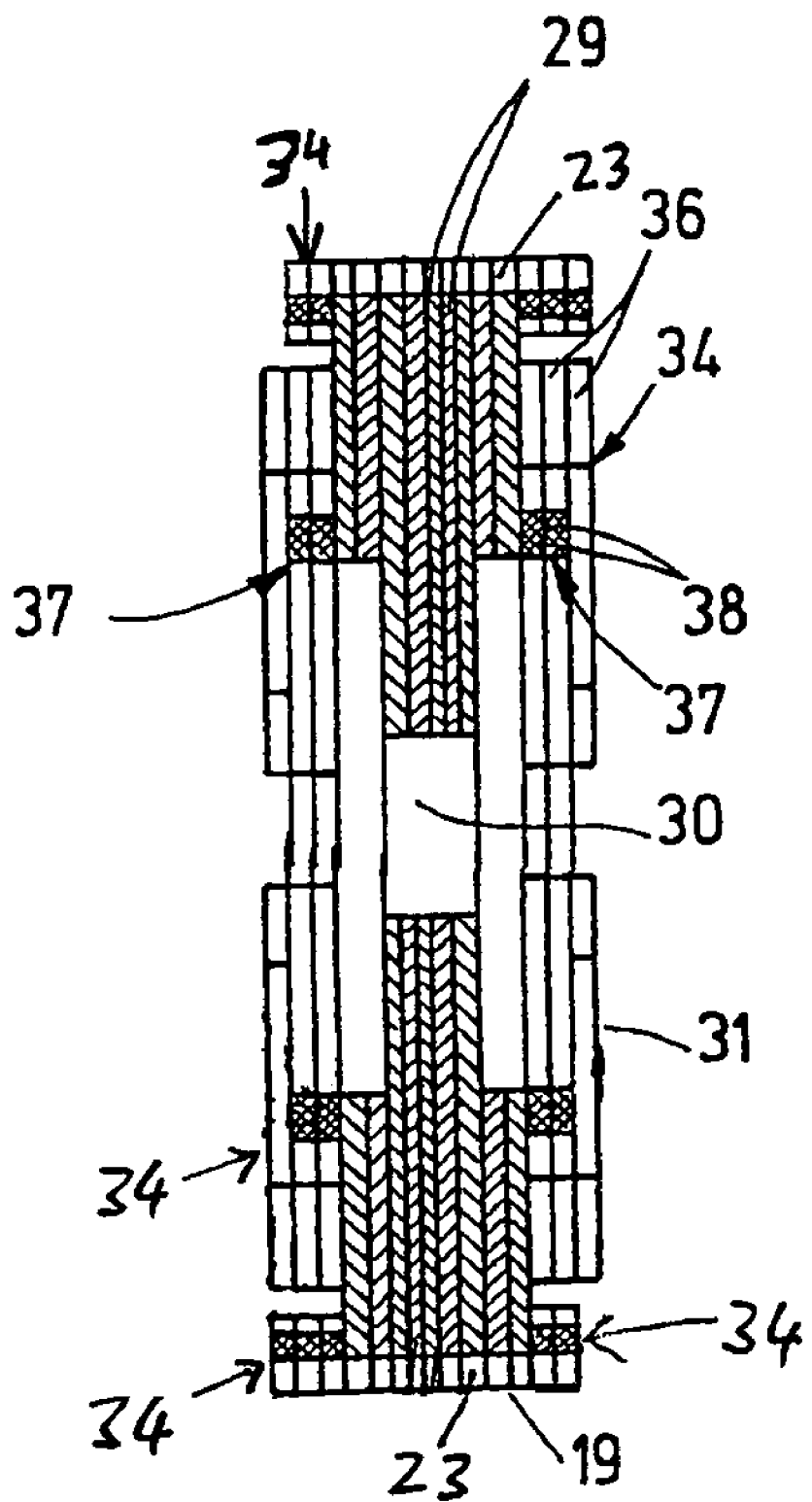
FIG. 8 is a section view similar to FIGS. 3 and 5, illustrating a further embodiment of the invention.

To compensate for an imbalance of the armature that occurs for instance when the armature shaft is supported in an eccentric bearing that is fixed in a built-in module of the motor, at at least one selected tooth head 23 the flux-conducting element 34 is put together from a number of laminations 36 that is less than the number of laminations in the other flux-conducting elements 34, which all have the same number of laminations (FIG. 8). The selection of the tooth head 23 is made in accordance with the location of the imbalance to be compensated for. In this case, the term used is a static imbalance compensation. For a dynamic imbalance compensation, a further flux element 34, which is mounted on a tooth head 23 located diametrically of the tooth head 23 that carries the flux-conducting element 34 having the reduced number of laminations, or in other words that is rotated from it by a circumferential angle of 180°, is equipped with the same reduced number of laminations. This flux-conducting element 34 with the reduced number of laminations is seated on the particular end face of the tooth head 23 that faces away from the end face of the other tooth head 23 that carries the other flux-conducting element 34 having the reduced number of laminations. The number of laminations 36 in the two flux-conducting elements 34 having the reduced number of laminations is the same.

To prevent the winding heads of the annular coils 24 of the armature winding 25 from protruding into the region of the through holes 31 in the outer armature laminations 29, which region must be kept free for the commutator 26 and/or the rotary bearing 16, one annular barrier 37 is placed on each of the two end faces of the armature body 19, in the region of the short-circuit ring 21. One barrier 37 on one face end of the armature body 19 can be seen in plan view in FIG. 2 and in a side view in FIG. 7. The barrier 37 is again embodied in stacked form and is put together for instance from two laminations 38 by stamping packeting. From one lamination 38, a total of six linking pins 39 protrude, which are located equidistantly in the circumferential direction of the lamination 38. The rotary angle spacing of the linking pins 39 corresponds to the rotary angle spacing of the linking holes 33 in the region of the short-circuit ring 21 in the armature body 19. Like the flux-conducting elements 34, the barriers 37 on the armature body 19 are secured by pressing the linking pins 39 into the linking holes 33. The thickness or axial width of the laminations 38 of the barriers 37 again corresponds to the lamination thickness of the armature laminations 29.

The foregoing relates to a preferred exemplary embodiment of the invention, it being understood that other variants and embodiments thereof are possible within the spirit and scope of the invention, the latter being defined by the appended claims.

In FIGS. 2 and 3, the armature body 19, with the flux-conducting elements 34 and barriers 37 mounted on it, can be seen in plan view (FIG. 2) and in section (FIG. 3). In the upper half of the sectional view in FIG. 3, the stacking of the armature body 19, flux-conducting elements 34 and barriers 37 is shown; it is not shown in the lower half of the sectional view. In FIGS. 4 and 5, the armature body 19 is shown with the flux-conducting elements 34 and barriers 37 removed, in plan view (FIG. 4) and in section (FIG. 5). Once again, the stacking is shown only in the upper half of the sectional view.

The invention claimed:
1. An armature for a permanent-magnet-excited DC motor, the motor comprising
    an armature body with armature teeth, the body and teeth being joined together in one piece together via a short-circuit ring, the teeth being offset from one another by equal circumferential angles and each having one tooth neck for receiving an armature winding and one tooth head protruding in the circumferential direction past the tooth neck and terminating in axially directed face ends, and at least one flux-conducting element mounted on each of the axially pointing face ends of the tooth heads, the flux-conducting elements having a profile corresponding to the tooth head profile, further comprising linking holes in the face ends of the tooth heads and axially protruding linking pins, which can be pressed into the linking hole, on the flux-conducting elements.

2. The armature as defined by claim 1, wherein two linking holes spaced apart from one another in the circumferential direction are located in each end face of the tooth heads, and two linking pins spaced equally apart in the circumferential direction are located on each flux-conducting element.

3. The armature as defined by claim 1, further comprising at least one annular barrier on each of the axially pointing end faces of the short-circuit ring.

4. The armature as defined by claim 2, further comprising at least one annular barrier on each of the axially pointing end faces of the short-circuit ring.

5. The armature as defined by claim 3, wherein the annular barriers are mounted in pushbutton-like fashion onto the short-circuit ring.

6. The armature as defined by claim 4, wherein the annular barriers are mounted in pushbutton-like fashion onto the short-circuit ring.

7. The armature as defined by claim 5, further comprising a plurality of linking holes in each end face of the short-circuit ring and a plurality of linking pins congruently located on the annular barriers for pressing into the linking holes.

8. The armature as defined by claim 6, further comprising a plurality of linking holes in each end face of the short-circuit ring and a plurality of linking pins congruently located on the annular barriers for pressing into the linking holes.

9. The armature as defined by claim 1, wherein the armature body is composed of a plurality of identically designed armature laminations resting on one another.

10. The armature as defined by claim 2, wherein the armature body is composed of a plurality of identically designed armature laminations resting on one another.

11. The armature as defined by claim 5, wherein the armature body is composed of a plurality of identically designed armature laminations resting on one another.

12. The armature as defined by claim 1, wherein the flux-conducting elements and/or the barriers are stacked.

13. The armature as defined by claim 12, wherein the laminations of the flux-conducting elements and barriers, respectively, have the same lamination thickness as the armature laminations of the armature body.

14. The armature as defined by claim 12, wherein all the flux-conducting elements have the same number of laminations; and wherein at least one flux-conducting element is composed of what is by comparison a reduced number of laminations.

15. The armature as defined by claim 13, wherein all the flux-conducting elements have the same number of laminations; and wherein at least one flux-conducting element is composed of what is by comparison a reduced number of laminations.

16. The armature as defined by claim 14, wherein at least two flux-conducting elements are each embodied with a reduced number of laminations and are placed on end faces, facing away from one another, of tooth heads located diametrically of one another.

17. The armature as defined by claim 15, wherein at least two flux-conducting elements are each embodied with a reduced number of laminations and are placed on end faces, facing away from one another, of tooth heads located diametrically of one another.

18. The armature as defined by claim 17, wherein the number of laminations of the flux-conducting elements embodied with a reduced number of laminations is the same.

* * * * *